(12) United States Patent
Tresan

(10) Patent No.: US 11,885,094 B2
(45) Date of Patent: Jan. 30, 2024

(54) PRODUCT AND METHOD FOR SEALING AND LUBRICATING SEWER MANHOLE ASSEMBLIES

(71) Applicant: OATEY CO., Cleveland, OH (US)

(72) Inventor: Blake R Tresan, Truckee, CA (US)

(73) Assignee: Oatey Co., Cleveland, OH (US)

( * ) Notice: Subject to any disclaimer, the term of this patent is extended or adjusted under 35 U.S.C. 154(b) by 571 days.

(21) Appl. No.: 17/103,161

(22) Filed: Nov. 24, 2020

(65) Prior Publication Data

US 2022/0163113 A1 May 26, 2022

(51) Int. Cl.
| | |
|---|---|
| *E02D 29/14* | (2006.01) |
| *F16J 15/16* | (2006.01) |
| *F16J 15/40* | (2006.01) |
| *E02D 31/00* | (2006.01) |
| *F16J 15/06* | (2006.01) |

(52) U.S. Cl.
CPC ............ *E02D 29/14* (2013.01); *E02D 29/149* (2013.01); *E02D 31/004* (2013.01); *F16J 15/06* (2013.01); *F16J 15/40* (2013.01)

(58) Field of Classification Search
CPC ..... E02D 29/14; E02D 29/149; E02D 31/004; F16J 15/14; F16J 15/32; F16J 15/002; F16J 15/16; F16J 15/40
See application file for complete search history.

(56) References Cited

U.S. PATENT DOCUMENTS

| | | | | |
|---|---|---|---|---|
| 3,576,326 A | * | 4/1971 | Hafner | F16J 15/328 |
| | | | | 384/138 |
| 4,186,056 A | * | 1/1980 | Muller | C10B 25/24 |
| | | | | 202/250 |
| 4,203,686 A | * | 5/1980 | Bowman | E02D 29/14 |
| | | | | 220/301 |
| 4,313,405 A | * | 2/1982 | Skatsche | F02F 7/008 |
| | | | | 123/195 S |
| 4,428,589 A | * | 1/1984 | Reinsma | F16J 15/32 |
| | | | | 277/637 |
| 4,440,407 A | * | 4/1984 | Gagas | F16J 15/106 |
| | | | | 52/19 |

(Continued)

FOREIGN PATENT DOCUMENTS

DE 102015219234 A1 * 4/2017

OTHER PUBLICATIONS

Outgoing—ISA/210—International Search Report dated Feb. 8, 2022 for WO Application No. PCT/US21/060458.

(Continued)

*Primary Examiner* — Phi D A
(74) *Attorney, Agent, or Firm* — BakerHostetler

(57) ABSTRACT

A sewer manhole cover includes a frame having an access aperture and a cover for covering the access aperture. A primary seal is generated when the cover is placed on the frame either by way of contact between the frame and cover or by way of a gasket received within a groove formed into one of the frame or cover, wherein the gasket is compressed between the frame and cover. A method is provided for generating a secondary seal between the frame and cover by applying an amount of a viscous compound to a circumferential surface of the frame or cover, wherein the secondary seal is formed when the cover compresses the compound when the cover is received within the frame.

4 Claims, 4 Drawing Sheets

(56) References Cited

U.S. PATENT DOCUMENTS

| | | | |
|---|---|---|---|
| 4,567,697 A | 2/1986 | Hahne | |
| 4,706,718 A * | 11/1987 | Milo | B65D 90/105 |
| | | | 404/26 |
| 4,763,449 A | 8/1988 | Vigneron et al. | |
| 4,772,031 A * | 9/1988 | Poppo | F16L 55/175 |
| | | | 277/609 |
| 4,961,599 A * | 10/1990 | Delery, Jr. | F16L 21/02 |
| | | | 277/625 |
| 5,021,261 A * | 6/1991 | Bowman | E02D 29/124 |
| | | | 427/286 |
| 5,085,257 A * | 2/1992 | Smith | B65D 90/105 |
| | | | 220/86.1 |
| 5,090,713 A * | 2/1992 | Johnson | E02D 29/14 |
| | | | 277/648 |
| 5,201,600 A * | 4/1993 | Topf, Jr. | E02D 29/14 |
| | | | 156/295 |
| 5,240,346 A * | 8/1993 | Yin | E02D 29/149 |
| | | | 404/25 |
| 5,404,676 A * | 4/1995 | Devlin | E02D 29/14 |
| | | | 49/463 |
| 6,109,824 A * | 8/2000 | Annes | E03F 5/0401 |
| | | | 404/26 |
| 6,205,931 B1 * | 3/2001 | Degutis | B61D 7/32 |
| | | | 105/282.2 |
| 6,350,081 B1 * | 2/2002 | Khajavi | E02D 29/1436 |
| | | | 49/21 |
| 6,464,425 B1 * | 10/2002 | Closkey | E02D 29/14 |
| | | | 404/26 |
| 6,698,973 B2 * | 3/2004 | Suatac | E02D 29/122 |
| | | | 404/26 |
| 6,948,287 B2 * | 9/2005 | Korn | E04D 13/1415 |
| | | | 52/273 |
| 9,702,464 B1 * | 7/2017 | Busby | F16J 15/126 |
| 10,011,971 B1 * | 7/2018 | Neathery | B29C 33/3842 |
| 2003/0175482 A1 * | 9/2003 | Porter | F16J 15/14 |
| | | | 277/654 |
| 2012/0160854 A1 * | 6/2012 | Defoe | F16J 15/14 |
| | | | 277/316 |
| 2014/0137496 A1 * | 5/2014 | Fletcher | A47K 3/008 |
| | | | 52/287.1 |
| 2016/0116064 A1 * | 4/2016 | Larson | F16J 15/10 |
| | | | 277/628 |
| 2018/0355577 A1 * | 12/2018 | Barton | E02D 29/149 |
| 2020/0248811 A1 * | 8/2020 | Fukuyama | H05K 5/0056 |

OTHER PUBLICATIONS

Outgoing Written Opinion of the ISA dated Feb. 8, 2022 for WO Application No. PCT/US21/060458.

* cited by examiner

PRODUCT AND METHOD FOR SEALING AND LUBRICATING SEWER MANHOLE ASSEMBLIES

TECHNICAL FIELD

The present invention relates to sewage collection and conveyance, and more particularly to manhole assemblies for accessing sewage pipelines and other underground utilities.

BACKGROUND

Most cities and municipalities own, operate, and maintain a network of sewage pipelines for transporting residential, commercial, and industrial wastewater to a central processing facility for treatment and disposal or reuse. Many cities and municipalities also have a separate system to convey rainwater and other surface water run-off for separate handling. Sewer manhole assemblies provide access to these underground pipelines. Sewer manhole assemblies often have an issue with the infiltration and inflow of rainwater, water run-off, and groundwater. Sewage pipelines are designed to handle wastewater at a peak or maximum amount—for example, if every shower were running and every toilet were flushed at the same time. However, surface and ground water infiltration and inflow into the sewer system can result in increased volume of fluid within the sewage system which can exceed the capacity of the sewer system. The increased flow in the sewer system due to surface and groundwater infiltration and inflow results in the need to sometimes oversize sewer handling facilities, increased energy costs to process the additional flows, backups into structures, and sanitary sewer overflows that can contaminate water bodies and present a public health risk. Thus, those that design the sewage systems typically increase the size and capacity of the sewage pipelines and handling facilities to account for additional water infiltration and inflow—sometimes doubling or tripling the size of the pipes for handling an unknown amount of extra fluid. This increased fluid handling capabilities of the sewage piping system results in significant cost increases to the municipalities. A need therefore exists for a method for sealing the manhole assemblies to reduce or eliminate the infiltration and inflow of rainwater and groundwater.

In addition, other problems associated with sewer manhole assemblies is worker injuries. Over time, manhole covers can become stuck to the frame such that it is difficult to remove the cover to access the sewer system. When the cover gets stuck, it often takes two workers to remove the cover wherein one worker uses a pick, pole, crow bar, or other lever to separate the cover from the frame. The second worker sometimes uses a hammer or other percussive tool to help separate the cover from the frame. However, the noise generated by the percussive contact between the hammer and the cover can cause hearing damage to the workers. Further, pushing the lever or attempting to lift a stuck cover can also cause back pain or damage to the worker as well.

A need therefore exists to provide a seal between a cover and frame of a sewer manhole assembly to prevent water infiltration and inflow. A need also exists to provide lubrication between a cover and frame of a sewer manhole assembly to make it easier to separate and remove the cover from the frame.

SUMMARY

In one aspect of the present invention, a method for creating a secondary seal for a manhole assembly is provided. The method includes providing a frame defining an access aperture therein and a cover received by the frame for covering the access aperture. The cover and the frame each having at least one circumferential surface. The method also includes providing a primary seal between the cover and the frame when the cover is received within the frame. The method further includes applying an amount of compound to one of the circumferential surfaces of the cover or one of the circumferential surfaces of the frame to generate a secondary seal between the cover and the frame.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
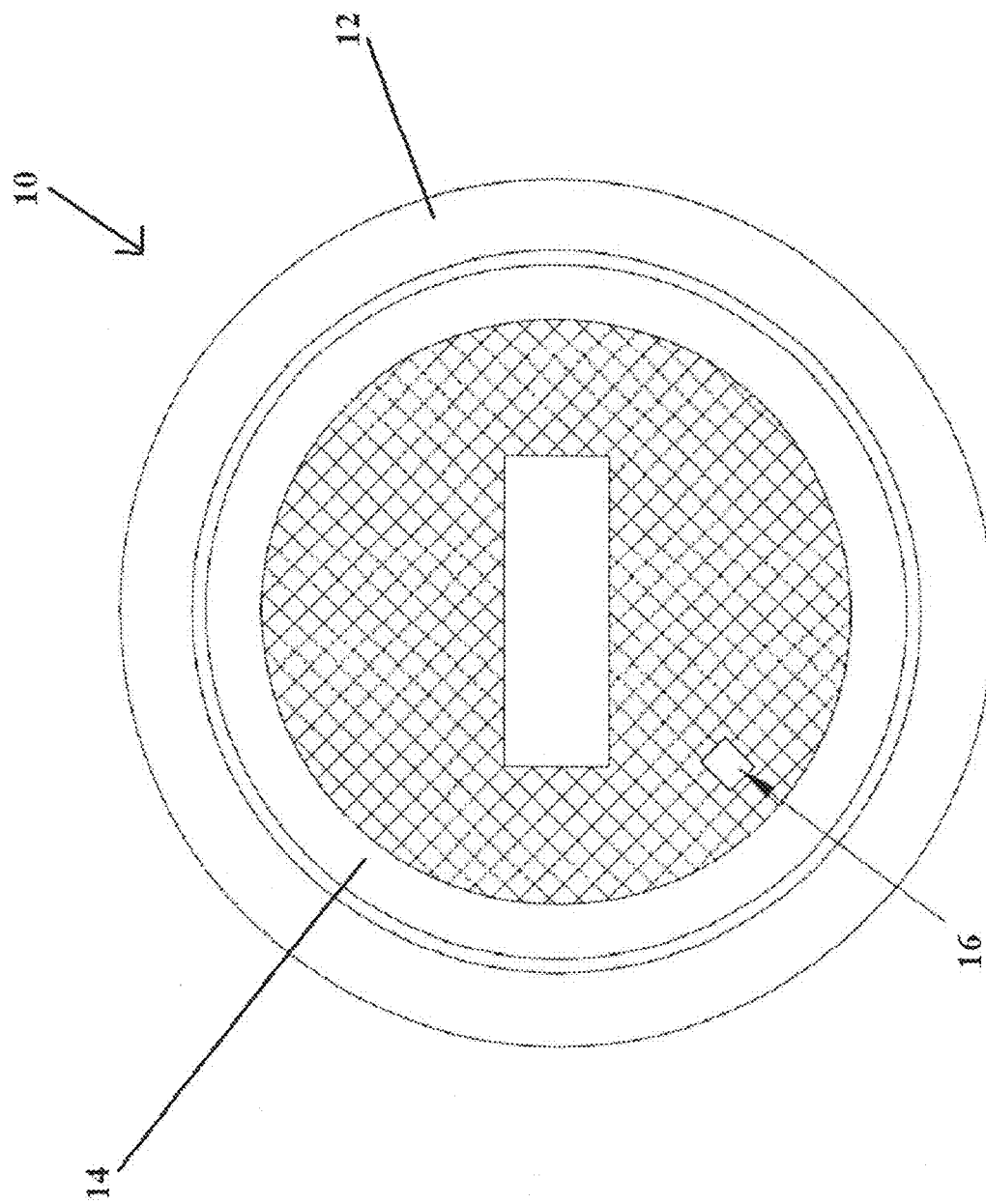
FIG. 1 illustrates a top view of an exemplary embodiment of a manhole assembly.
Figure 2:
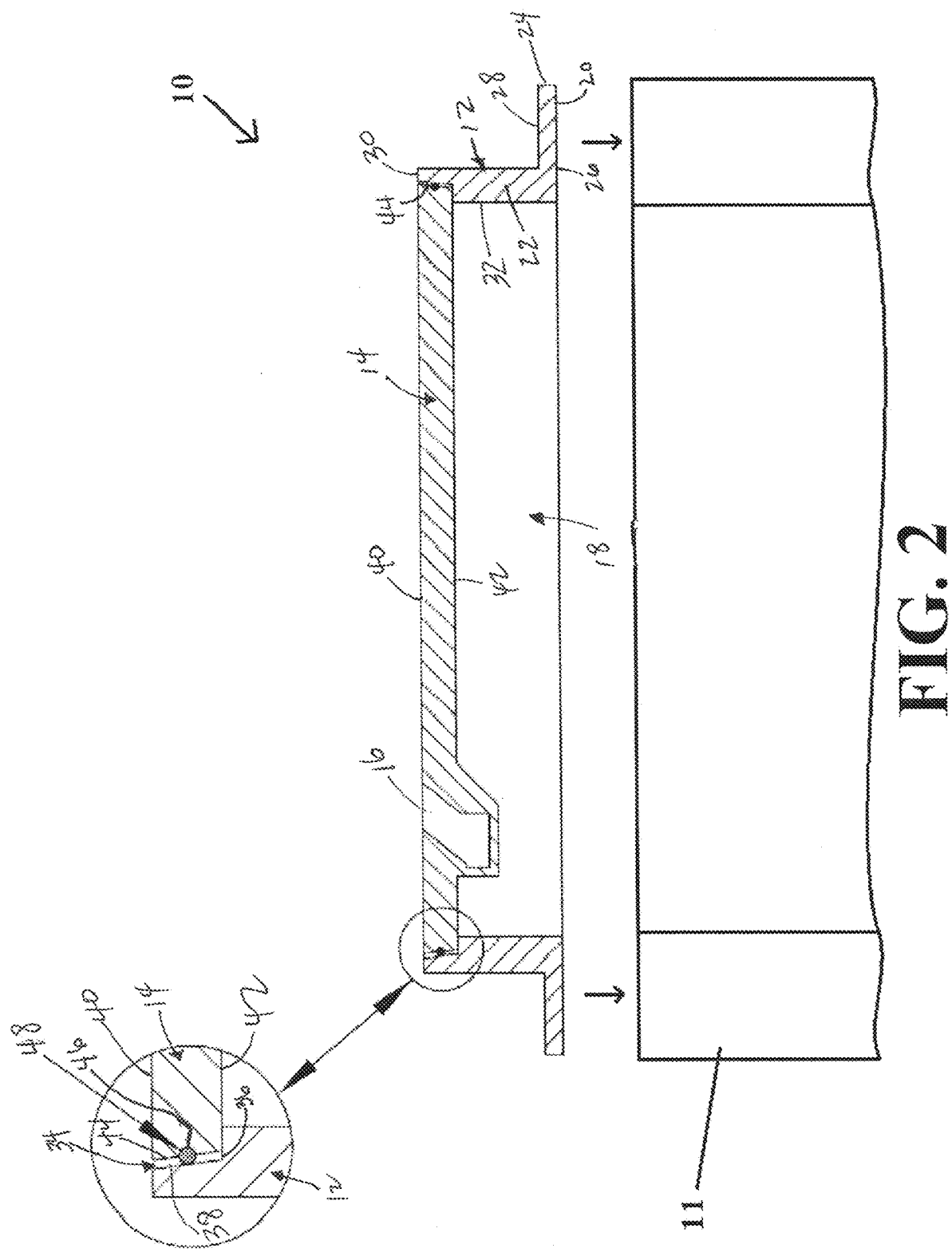
FIG. 2 illustrates a cross-sectional view of the manhole assembly shown in FIG. 1.

Referring to FIGS. 1-2, an exemplary embodiment of a manhole assembly 10 is shown. The manhole assembly 10 is configured to fit atop a cylindrical tube or shaft 11, typically formed of concrete, which leads to the main sewer pipeline that leads to a sewage processing facility. A manhole assembly 10 can also be configured to fit atop a cylindrical tube or shaft 11 that leads to other underground utilities such as internet cables, telephone cables, electric cables, and the like to provide access to the underground utility lines. It should be understood by one having ordinary skill in the art that manhole assembly 10 can be utilized in a variety of different application, whereby the manhole assembly 10 provides access through a removable lid or cover. The manhole assembly 10 provides access through which a person can enter a vertical cylindrical shaft 11. In the illustrated embodiment, the manhole assembly 10 includes a frame 12 and a cover 14, wherein the cover 14 is received within and by the frame 12. The frame 12 is configured to rest on or be attached to the vertical shaft 11. The cover 14 is selectively removable from the frame 12. In some embodiments, the cover 14 includes a pick hole 16 that is configured to receive a pick, pole, hook, or other lever to aid in leveraging the cover 14 during removal thereof from the frame 12.

As shown in FIGS. 1-2, the exemplary embodiment of the frame 12 is placed on the upper end of a vertical shaft 11, wherein the vertical shaft 11 extends downwardly to the sewage lines, utility shafts, or the like. The frame 12 is a generally circular member defining an access aperture 18 defined centrally therethrough. The frame 12 includes a base 20 and a wall 22 integrally formed to the base 20 and extending at an angle therefrom. In the illustrated embodiment, the wall 22 extends from the base 20 perpendicularly, but it should be understood by one having ordinary skill in the art that the wall 22 can extend from the base 20 at any angle. The base 20 is an annular member having an outer circumferential edge 24, a lower surface 26, and an upper surface 28. The lower surface 26 of the base 20 is configured to contact the upper surface of the shaft 11. The base 20 extending laterally from the wall 22 forms a ledge, which is typically positioned below concrete or asphalt. The wall 22 extends upwardly from the base 20, and similar to the base 20, a portion of the wall 22 is typically surrounded by concrete or asphalt such that the upper edge of the wall 22 is exposed. The wall 22 includes an upper edge 30 and an inner surface 32.

In an embodiment of the frame 12, the wall 22 includes a notch 34 formed into the upper edge 30 and inner surface 32, as shown in FIG. 2. The notch 34 is generally L-shaped, wherein the notch 34 is configured to receive the cover 14. The notch 34 is defined by a generally horizontal support surface 36 and a bearing surface 38 extending at an angle relative to the support surface 36. In an embodiment, the bearing surface 38 is oriented perpendicular relative to the support surface 36. In the illustrated embodiment, the bearing surface 38 extends from the support surface 36 at an angle larger than 90°. In some embodiments, the angle at which the bearing surface 38 extends from the support surface 36 is between about 90°-135°. Both the support surface 36 and the bearing surface 38 provide a circumferential surface—or an annular surface—that creates a complete circumference about the access aperture 18. These circumferential surfaces provide surfaces to which a compound 50 can be applied to form a complete circumferential secondary seal between the cover 14 and the frame 12, as will be explained in further detail below.

In the illustrated embodiment shown in FIGS. 1-2, the cover 14 of the manhole assembly 10 is a disc-shaped member configured to be removably seated within the frame 12. The cover 14 includes an upper surface 40, a lower surface 42, and a peripheral surface 44 that extends between the upper and lower surfaces 40, 42. The upper and lower surfaces 40, 42 are oriented substantially parallel to each other, and the peripheral surface 44 is oriented at an angle relative to the upper and lower surfaces 40, 42. In an exemplary embodiment, the peripheral surface 44 is oriented at an angle between about 45°-90° relative to the lower surface 42. In an embodiment, the angle of the peripheral surface 44 is substantially the same as the bearing surface 38 of the notch 34 formed in the frame 12. A groove 46 is formed into the peripheral surface 44 about the entire circumference of the cover 14. The groove 46 is configured to receive a gasket 48. In an embodiment, the gasket 48 is formed as an O-ring, but it should be understood by one having ordinary skill in the art that the gasket 48 can be formed of any semi-flexible ring-shaped member having a continuous cross-sectional shape. In other embodiments of the cover 14, the peripheral surface 44 is planar and does not include a groove for receiving a gasket. In further embodiments, the lower surface 42 includes a circular groove formed therein, wherein the groove receives a gasket configured to be positioned between the lower surface 42 of the cover 14 and the frame 12 to provide a primary seal therebetween. In other embodiments the frame 12 includes a circular groove formed in the surface that cooperates with the lower surface of the cover 14, wherein the groove is configured to receive a gasket for providing a seal between the cover 14 and the frame 12. It should be understood by one having ordinary skill in the art that a gasket can be connected to either the cover or frame (and at any location where the cover and frame would otherwise contact each other).

Both the peripheral surface 44 and the lower surface (the outer portion of the lower surface that contacts the support surface 36 of the frame 12) provide a complete circumferential surface about the access aperture 18. These circumferential surfaces provide surfaces to which a compound 50 can be applied to form a complete circumferential secondary seal between the cover 14 and the frame 12, as will be explained in further detail below.

In the embodiments of the manhole assemblies 10 having a gasket 48 positioned between the frame 12 and the cover 14, the gasket 48 provides a primary seal between the cover 14 and frame 12. In the embodiments of the manhole assemblies 10 having no gasket positioned between the frame 12 and the cover 14, the primary seal is formed between the cover and the frame through the abutting contact of the cover 14 and the frame 12.

The exemplary embodiment of the manhole assembly 10 shown in FIGS. 1-2 is assembled by positioning the frame 12 atop a vertical shaft 11. Once the frame 12 is secured, the gasket 48 is seated into the groove 46 of the cover 14. The cover 14 is then lowered into the notch 34 formed in the frame 12 that is configured to receive the cover 14. As the cover 14 is lowered onto the frame 12, the peripheral surface 44 of the cover 14 aligns with the bearing surface 38 of the frame 12 and the gasket 48 contacts the bearing surface 38. When fully seated, the peripheral surface 44 of the cover 14 contacts the bearing surface 38 of the frame 12 while the gasket 48 is compressed therebetween. In other embodiments, when fully seated, the peripheral surface 44 of the cover 14 is slightly spaced apart from the bearing surface 38 of the frame 12 such that the gasket 48 fills the gap therebetween to form the primary seal. In some embodiments, the lower surface 42 of the cover 14 contacts the support surface 36 of the notch 34 formed in the wall 22 of the frame 12. The compressed gasket 48 is configured to provide a primary seal between the cover 14 and the frame 12 to prevent water inflow and infiltration through the manhole assembly 10. However, the typical wear and tear of everyday use of the gasket 48 often results in pieces breaking off the gasket 48 or the ring itself to break, thereby creating gaps between the cover 14 and frame 12 that allows for rainwater and groundwater infiltration and inflow through the manhole assembly 10. It should be understood by one having ordinary skill in the art that inflow of surface water between the frame 12 and cover 14 can occur when the frame 12 and cover 14 are not perfectly machined and matched or if grit gets worked between the frame and cover which prevents a complete seal therebetween.

For embodiments of a manhole assembly 10 having a cover 14 with a flat peripheral surface 44 that does not include a groove and corresponding gasket seated therewithin, the cover 14 is lowered onto the frame 12 such that the peripheral surface 44 of the cover 14 and the bearing surface 38 of the frame 12 as well as the lower surface 42 of the cover and the support surface 36 of the frame contact each other to provide a primary seal therebetween. In the embodiments of the manhole assemblies 10 that do not include a gasket, dirt and grit can work their way between the cover 14 and frame 12, thereby compromising the seal therebetween which allows water infiltration and inflow. It should be understood by one having ordinary skill in the art that due to manufacturing tolerances and materials used, this manhole assembly 10 design typically allows much more rainwater and groundwater infiltration and inflow therethrough than the cover 14 that includes a gasket 48.

Figure 3:
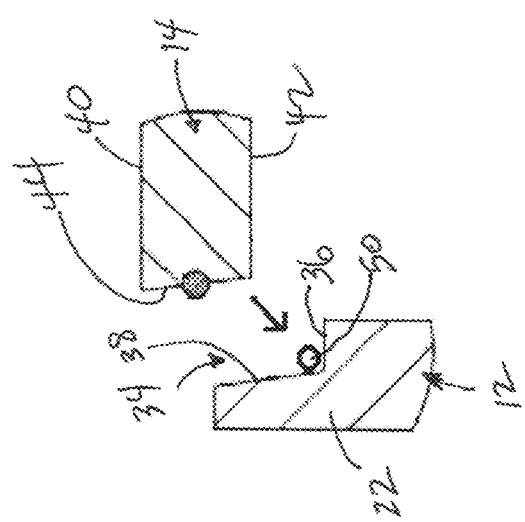
FIG. 3 illustrates a portion of a cover spaced apart from a frame of a manhole assembly having a portion of a compound dispensed on the frame.
Figure 4:
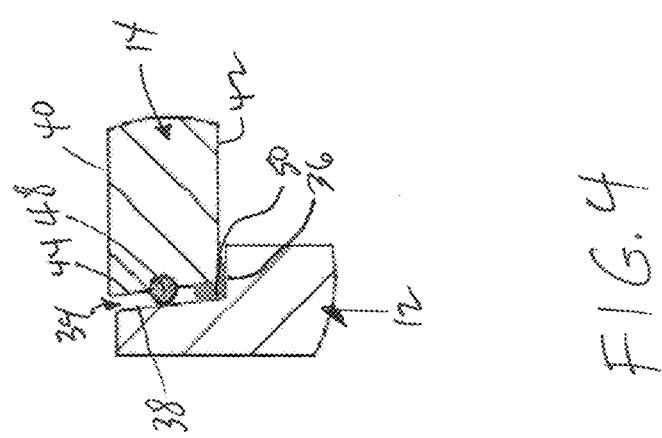
FIG. 4 illustrates a portion of a cover received on a frame of a manhole assembly having a primary seal generated by a compound.

FIGS. 3-4 illustrate a method for generating a secondary seal between the cover 14 and the frame 12 of a manhole assembly 10. The method includes providing a manhole assembly 10 having a frame 12 configured to receive a cover 14. The frame 12 includes a notch 34 formed into the wall 22, wherein the notch 34 is defined by a support surface 36 and a bearing surface 38 that extends from the support surface 36 at an angle therebetween. The method further includes providing a cover 14 has an upper surface 40, lower surface 42, and a peripheral surface 44 extending between the upper and lower surfaces 40, 42. The method also includes providing a primary seal between the cover 14 and the frame 12, wherein the primary seal can be formed by way of abutting contact between the cover 14 and frame 12 or by way of a gasket 48 positioned and compressed between the cover 14 and the frame. In an embodiment, the cover 14 includes a gasket 48 seated within a groove 46 formed into the peripheral surface 44. In other embodiments, the cover 14 does not include a groove for receiving a gasket therein.

The method further includes depositing a quantity of compound 50 into the corner or intersection between the support surface 36 and bearing surface 38 of the notch 34 of the frame 14. It should be understood that the compound 50 can be added to either the frame 12 or the cover 14 to generate a secondary seal when the cover 14 is placed on the frame 12. In an embodiment, the compound 50 is deposited as a bead, or line of compound 50. Such a bead of compound 50 can be deposited by way of a tube having a nozzle, wherein the compound 50 flows out of the nozzle to form a generally annular ring of compound 50 about the notch 34. In other embodiments, the compound 50 is deposited as a generally amorphous quantity and spread onto the cover 14 or frame 12 into a circumferential manner. The compound 50 can be deposited by hand, using a trowel or scraper, or any other manner to deposit a quantity of compound 50 on the frame 12 to form a circumferential deposition of the compound. In order to provide the most effective secondary seal, the compound 50 is placed in the corner or intersection about the entire circumference of the notch 34. As the cover 14 is lowered onto the frame 12, the corner of the cover 14 formed at the intersection between the lower surface 42 and the peripheral surface 44 thereof contacts the quantity of compound 50 as the cover 14 compresses the circumferential deposition of the compound 50. Because the compound 50 has a viscosity that allows it to flow, as the cover 14 is positioned in the notch 34 of the frame 12 which compresses the compound 50, the compound 50 flows to fill the gaps, holes, or other spaces and vacancies between the cover 14 and the frame 12 below the gasket 48. The result is a secondary seal is created between the frame 12 and the cover 14 to prevent infiltration and inflow of rainwater, groundwater, and water run-off through the manhole assembly 10. It should be understood by one having ordinary skill in the art that the compound 50 can be applied to either the cover 14 or the frame 12 in order to create a secondary seal therebetween. It should also be understood by one having ordinary skill in the art that the compound 50 is applied in a continuous bead or amount about the entire annular surface of the cover 14 or frame 12 in order to prevent any sections or portions of the interface between the cover 14 and frame 12 from not having the secondary seal formed between them. It should further be understood by one having ordinary skill in the art that even if there are very small sections of the interface between the cover 14 and frame 12 that may be missing some compound 50 applied, the viscosity of the compound 50 is sufficient to flow or otherwise fill in small gaps as the cover 14 is seated on the frame 12.

Manhole assemblies 10 are accessed in order to address issues within the sewage and/or utility systems connected thereto. When an operator needs access through the manhole assembly 10, a pick, pipe, or other structure is inserted into the pick hole 16 of the cover 14 as a lever to separate the cover 14 from the frame 12. Once the cover 14 has been removed from the frame 12 and all sewer and/or utility work is completed, the operator applies the compound 50 between the cover 14 and the frame 12 per the method described above before replacing the cover 14 on the frame 12. For the first application of the compound 50 to the manhole assembly 10, the operator should take care to ensure the compound is applied to the entire circumference of the frame 12 or cover 14 to ensure a complete secondary seal between the cover 14 and the frame 12. After the first application of the compound 50 to the manhole assembly 10 when the manhole assembly is subsequently accessed, before the cover 14 is replaced on the frame 12, the operator should observe the previous application of the compound 50 for any sections or portions that are missing or need re-applied. Further, if there is significant loss of compound 50 between the cover 14 and frame 12 due to everyday wear, additional compound 50 can be added to ensure a proper secondary seal. In addition, when there has been dirt or grime that has worked into the compound 50 in place between the cover 14 and frame 12, the operator should use a rag, towel, or other cloth to remove as much of the previously-applied compound 50 and re-apply a fresh amount of compound 50 about the entire circumference of the cover-frame interface.

In addition to providing a secondary seal between the cover 14 and the frame 12, the compound 50 is also configured to provide lubrication therebetween. The compound 50 provides a barrier between the frame 12 and the cover to prevent the components from rusting together if the manhole assembly 10 is not accessed regularly. Also, the viscosity of the compound 50 allows the cover 14 to slide, or otherwise move relative to the frame more easily, thereby reducing the strain on the operators as they try to lift or remove the cover 14 from the frame 12. By providing a viscous barrier between the cover 14 and the frame 12 to lubricate the engagement therebetween, there will be a reduced number of injuries associated with the removal of the cover 14 from the frame.

In an embodiment, the compound 50 is a viscous material that can be easily applied to the frame 12 or cover 14 of the manhole assembly 10. The viscosity of the compound 50 allows the compound to be stored in a tube, and applicator, or other similar applicators such that the operator is not required to physically apply the compound by hand. It should be understood by one having ordinary skill in the art that the compound 50 can also be applied by-hand, wherein the compound 50 is non-adhesive which prevents the compound from sticking to hands or gloves in an adhering manner during application. The compound 50 should be able to be easily wiped off the body and manhole assembly 10 components for easy clean-up.

The secondary seal generated by the compound 50 being applied between the frame 12 and the cover 14 means that this seal is in addition to the primary seal between the frame 12 and cover 14 that was not previously formed therebetween prior to the addition of the compound 50. The secondary seal does not mean that it is the second barrier that any water run-off or groundwater contacts as it travels through the gap between the cover 14 and the frame 12. In some embodiments, the secondary seal generated by the application of the compound 50 can be the first barrier encountered by water run-off or groundwater that flows through the gap between the cover 14 and the frame 12.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A method for creating a secondary seal for a manhole assembly, said manhole assembly including a frame defining an access aperture therein and a cover received by said frame for covering said access aperture, said cover and said frame each having at least one circumferential surface, said method comprising:

providing a primary seal between said cover and said frame when said cover is received within said frame;

applying an amount of compound having a viscosity that allows it to flow to one of said circumferential surfaces of said cover or one of said circumferential surfaces of said frame to generate a circumferential deposition of said compound to form a secondary seal by said compound being compressed between said cover and said frame, wherein the compound is configured to provide a viscous barrier between said cover and said frame, to lubricate the engagement therebetween and thereby facilitate sliding or other movement of the cover relative to the frame, and to facilitate subsequent removal of the cover from the frame during use of the manhole.

2. The method of claim 1, wherein said primary seal between said cover and said frame is generated by a gasket received within a circumferential groove formed into said cover or said frame.

3. The method of claim 1, wherein said step of applying an amount of compound is achieved by placing a bead of compound about an entire circumference on one of said circumferential surfaces of said cover or said frame and spread to form a circumferential deposition of said compound.

4. The method of claim 1, wherein said step of applying an amount of compound is achieved by manually depositing an amorphous amount of compound on one of said circumferential surfaces of said cover or said frame and then spreading said compound to form a complete circumferential deposition of said compound.

* * * * *